United States Patent [19]

Shelstad

[11] 4,097,379
[45] Jun. 27, 1978

[54] SELF-CLEANING FILTER ASSEMBLY

[76] Inventor: Richard J. Shelstad, 2131 N. Summit, Milwaukee, Wis. 53212

[21] Appl. No.: 844,592

[22] Filed: Oct. 25, 1977

[51] Int. Cl.² ............................................. B01D 33/06
[52] U.S. Cl. .................................. 210/167; 210/172; 210/297; 210/393; 210/396
[58] Field of Search ............... 210/167, 172, 297, 312, 210/314, 318, 391, 393, 396

[56] References Cited

U.S. PATENT DOCUMENTS

| | | | |
|---|---|---|---|
| 1,151,999 | 8/1915 | Bird | 210/393 |
| 3,426,902 | 2/1969 | Kilpert et al. | 210/396 X |
| 3,450,266 | 6/1969 | Allen | 210/167 |
| 3,616,917 | 11/1971 | Hellwege | 210/167 |
| 3,915,865 | 10/1975 | Haji et al. | 210/396 X |

*Primary Examiner*—John Adee
*Attorney, Agent, or Firm*—Michael, Best & Friedrich

[57] ABSTRACT

The self-cleaning filter assembly includes a collecting tank for receiving a liquid, such as the dirty wash water from a car washing installation, containing suspended or dispersed substances to be removed. The dirty wash water passes through a filter cloth and an underlying layer of a porous, resilient material disposed about the outer periphery of a hollow, perforated drum which is rotatably mounted in the collecting tank. The filtered water passing through the filter material enters the interior of the drum through the drum perforations and is discharged therefrom through the open end of a perforated hollow shaft which serves as the axle for the drum. A roller biased into rolling engagement with the outer surface of the filter cloth presses or squeezes the resilient material, causing a portion of the filtered water retained in the resilient material to be forced back through the filter cloth and dislodge separated substances collected on the filter cloth. The back wash water containing the dislodged substances is collected and discharged from the collecting tank by a tray including a blade portion which is located adjacent the area of contact between the roller and the filter cloth and lightly rides on the outer surface of the filter cloth to "scrape" the wash water from the filter cloth.

15 Claims, 4 Drawing Figures

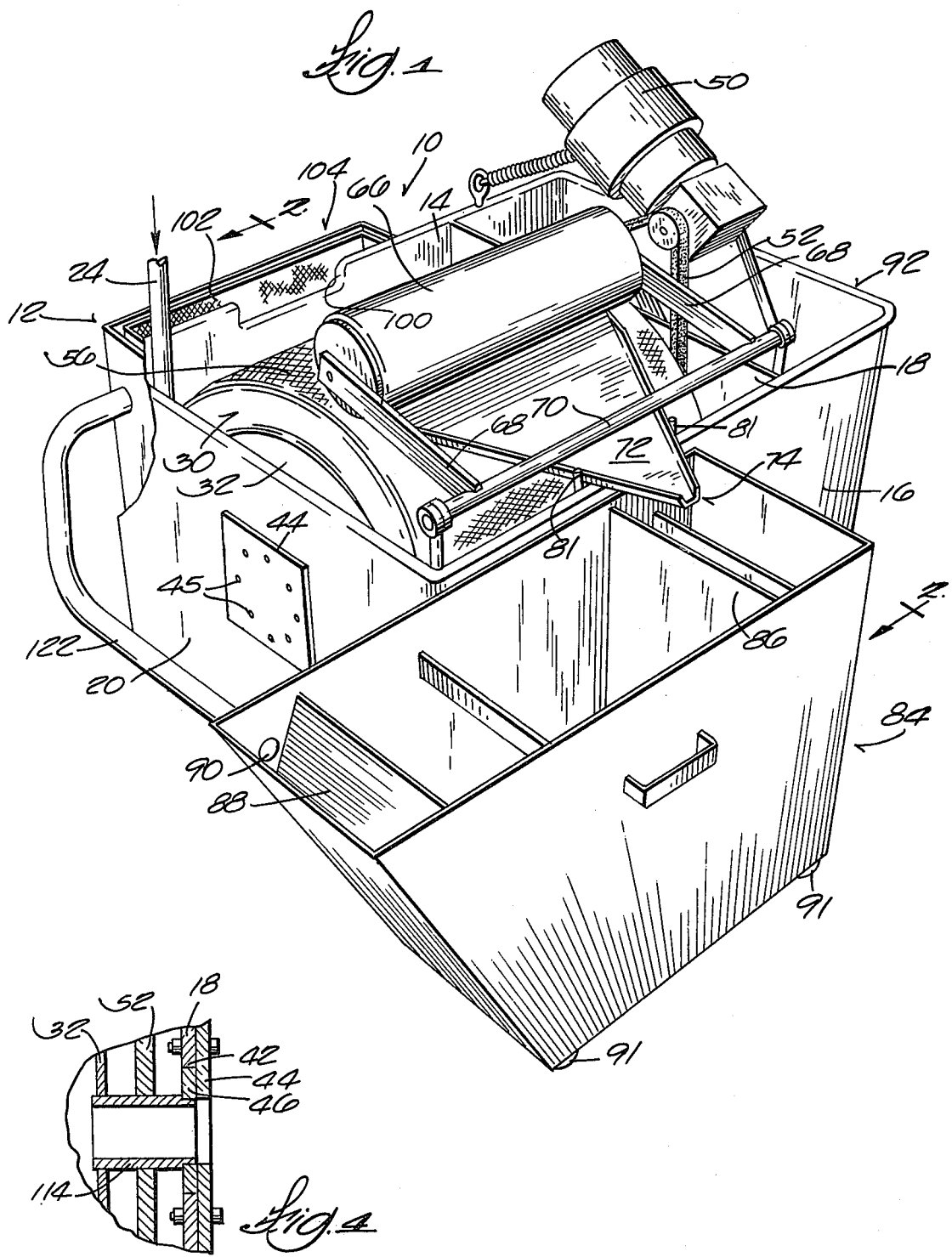

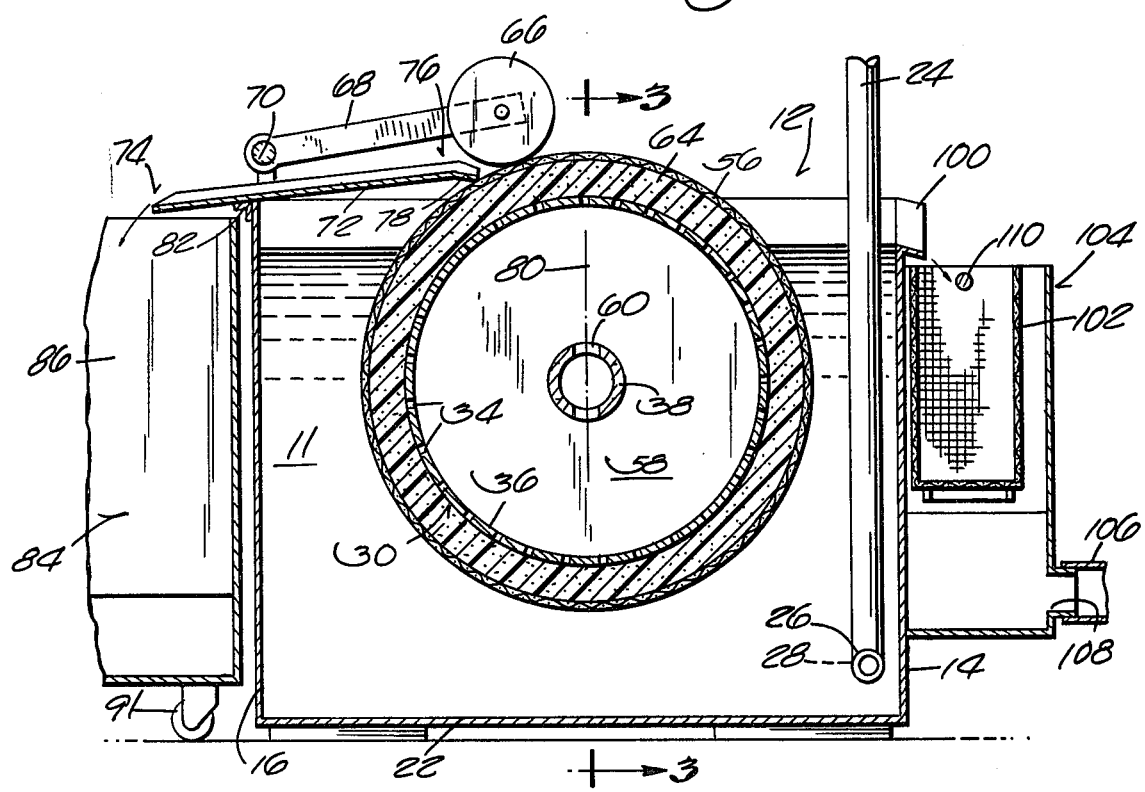
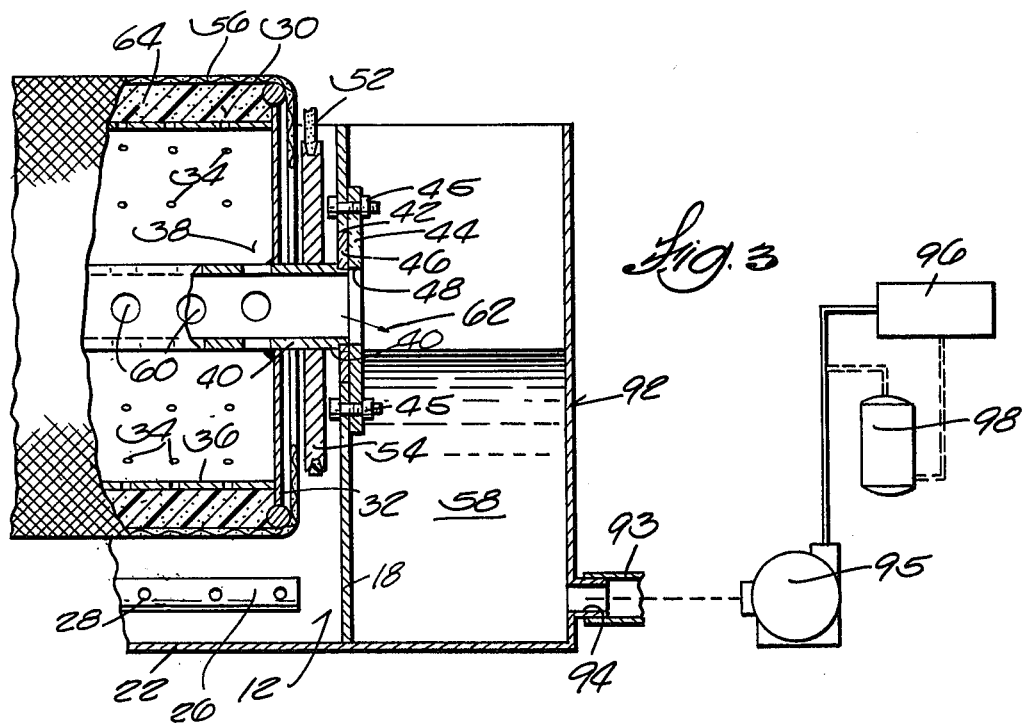

SELF-CLEANING FILTER ASSEMBLY

BACKGROUND OF THE INVENTION

This invention relates to filter assemblies and, more particularly, to self-cleaning filter assemblies which are particularly adaptable for use in wash water reclamation systems.

Water reclamation systems for car washing installations, coin-operated laundries and the like typically employ a cyclone-type centrifugal separator for removing suspended or dispersed substances, such as dirt, lint and the like, from the used wash water. Such separators generally are effective only for separating materials having a specific gravity greater than that of water. Consequently, lighter substances, such as lint, leaves, cigarette butts, paper, etc., are carried over with the overflow from the separator and an auxiliary filter, such as a sandbed, cloth filter, diatomaceous earth filter, etc., is required for removal of such lighter substances. These auxiliary filters eventually become plugged and must be replaced or periodically back washed to remove the plugging substances. If the latter type filter is used as the sole filtering means, this plugging problem occurs much more frequently.

SUMMARY OF THE INVENTION

A principal object of the invention is to provide a filter assembly which is capable of removing both light and heavy suspended or dispersed substances from a liquid without plugging.

Another principal object of the invention is to provide such a filter assembly including means for continuously back washing the filter medium.

A further principal object of the invention is to provide a simple, reliable filter assembly which is particularly adaptable for use in wash water reclamation systems and is capable of removing both light and heavy suspended or dispersed substances from the used wash water without the need for an auxiliary filter.

Other objects, aspects and advantages of the invention will become apparent to those skilled in the art upon reviewing the following detailed description, the drawings and the appended claims.

The invention provides a self-cleaning filter assembly including a collecting tank for receiving a quantity of a liquid containing suspended or dispersed substances, a peripherally perforated, hollow drum rotatably mounted in the collecting tank, a pliable filter material disposed about the outer periphery of the drum for filtering suspended substances from the liquid passing therethrough and subsequently through the drum perforations into the interior of the drum, and a layer of porous, resilient material, capable of absorbing a portion of the filtered liquid, interposed the filter material and the outer periphery of the drum. The filtered water discharged from the interior of the drum, preferably through a perforated hollow shaft serving as an axle for the drum into a holding tank or reservoir formed integrally with the collecting tank, can be recycled by a pump or similar means for reuse with or without additional treatment depending on the application. Means are provided for compressing or squeezing the resilient material so that a portion of the filtered liquid retained in the resilient material is forced back through the filtered material and serves as a back wash liquid for continuously dislodging filtered substances collected on the filter material. Also, means are provided for collecting the back wash water containing the dislodged substances and discharging same from the collecting tank.

In one embodiment, the squeezing means includes an elongated roller which is biased, preferably by gravity, into rolling engagement with the outer surface of the filter material with sufficient force to effect the desired compression or squeezing of the resilient material.

In another embodiment, the collecting means includes a tray having a discharge end spaced exteriorly of the collecting tank and an inlet located adjacent the area of contact between the roller and the filter cloth. The inlet end of the tray includes a blade portion which extends substantially along the length of the roller and lightly rides against the outer surface of the filter cloth just ahead of the roller to, in effect, "scrape" the back wash liquid from the filter cloth.

A settling or sludge tank, which preferably is separate and portable, can be provided for collecting the back wash liquid and separating the heavier components therefrom by settling. Also, floating solids can be separated from the liquid by providing a weired opening in the upper portion of the collecting tank through which a portion of the liquid overflows into an overflow tank containing a perforated trap which separates the floating substances from the overflowing liquid.

BRIEF DESCRIPTION OF THE DRAWINGS

FIG. 1 is a perspective view, partially broken away, of a filter assembly embodying the invention and particularly adapted for use in a car wash water reclamation system.

FIG. 2 is a sectional view taken generally along line 2—2 in FIG. 1.

FIG. 3 is a sectional view taken generally along line 3—3 in FIG. 1 and including additional components of the water reclamation system illustrated diagrammatically.

FIG. 4 is a fragmentary, sectional view of an alternate mounting arrangement for the drum.

DESCRIPTION OF THE PREFERRED EMBODIMENTS

Illustrated in the drawings is a filter assembly which is particularly adaptable for use in a water reclamation system for a car washing installation. However, it should be understood that the filter assembly of the invention can be used for a variety of applications where removal of suspended or dispersed substances from a liquid is desired.

The filter assembly 10 includes an open top collecting tank 12 for receiving a quantity of dirty, used wash water 11 recovered from the sump of a car washing installation and containing suspended substances, such as dirt, lint, leaves, cigarette butts, etc. The collecting tank 12 has front and rear walls 14 and 16, opposed side walls 18 and 20 and a bottom wall 22. The dirty wash water 11 is introduced into the collecting tank through an inlet conduit 24 which extends vertically into the collecting tank 12 near the corner of the front wall 16 and the side wall 20 and includes (See FIG. 3) a laterally extending lower portion 26 located near the bottom wall 22 and the front wall 14. The lower portion 26 of the inlet conduit 24 has a plurality of laterally spaced ports 28 through which the dirty wash water is discharged rearwardly into the collecting tank 12.

Rotatably mounted in the collecting tank 12 is a hollow, cylindrical drum 30 having closed opposite end walls 32 and a plurality of perforations 34 in the outer peripheral wall 36 thereof. In the specific construction illustrated in FIGS. 1-3, the drum 30 is rotatably supported from the side walls 18 and 20 of the collecting tank 12 by a hollow shaft 38 which extends through the drum 30 and is affixed to the drum end walls 32. The laterally outwardly extending opposite ends 40 (one shown) of the shaft 38 are rotatably mounted on respective side walls 18 and 20.

To facilitate installation of the drum 30 into the collecting tank 12, each of the side walls 18 and 20 is provided with a circular opening 42 having an inside diameter considerably larger than the outside diameter of the shaft 38. For installation, the drum 30 is cocked so that one end of the shaft 38 can be inserted through the respective opening 42 and then moved laterally so that the other end of the drum can be moved down to the tank to permit the other end of the shaft 38 to be inserted through the other opening 42. After the drum 30 has been moved into place, a plate 44, carrying an annular bushing 46 which extends into the opening 42 and rotatably receives a reduced portion on the outer end of the shaft 38, is exteriorly fastened, such as by bolts 45, on each of the collecting tank side walls 18 and 20. The plate 44 for the side wall 20 is solid while the plate 44 for the side wall 18 includes an opening 48 generally aligned with the interior passage of the shaft 38.

Suitably supported above the tank 12 is a motor 50 which rotates the drum 30 in a clockwise direction as viewed in FIG. 2 via a belt 52 and a pulley 54 fixedly mounted on the outer end 40 of the shaft 38.

As the drum 30 is rotated, the dirty wash water 11 in the collecting tank 12 passes through and is filtered by a pliable filter material, such as a suitable conventional filter cloth 56, disposed about the outer periphery of the drum 30 and suitably secured in place by a draw string (not shown) or the like. The weave size and density of the filter cloth 56 varies depending on the size and type of suspended substances to be filtered from the dirty wash water. Filtered wash water 58 passing through the filter cloth 56 enters the interior of the drum 30 through the perforations 34, flows into the interior passage of the shaft 38 through a plurality of ports 60 provided in the shaft 30, and eventually exits from the collecting tank through the open end of the shaft 38 as shown by arrow 62 in FIG. 3.

Interposed the filter cloth 56 and the outer periphery of the drum 30 is a layer of a porous, resilient material 62 which is capable of absorbing and retaining a portion of the filtered water 58 passing through the filter cloth 56 and which, upon being squeezed or compressed, serves to provide a back flow of filtered water through the filter cloth 56. Various suitable sponge-like materials can be used for this purpose, such as a pad of flexible polyurethane foam.

While other suitable means can be used for squeezing or compressing the resilient material 64, in the specific construction illustrated, such means include an elongated roller 66 which is biased into rolling engagement with the outer surface of the filter cloth 56 and compresses or squeezes the resilient material 64 as the drum 30 is rotated. The squeezing action provided by the roller 66 forces a portion of the filtered water retained in the resilient material 64 back through the filter cloth 56. Thus, the water being squeezed out of the resilient material 64 serves as a back wash for the filter cloth and dislodges dirt and other separated substances collected thereon.

In order to maximize this back washing effect, the roller 66 preferably extends substantially along the entire width of the filter cloth 56. The roller 66 is weighted and is rotatably carried for rotation about an axis parallel to the rotational axis of the drum 30 by a support structure including a pair of laterally spaced arms 68 fixedly mounted on and extending forwardly from a cross member 70 which is pivotally supported from the rear wall 16 of the collecting tank 12. With this arrangement, the roller 66 is biased by gravity into rolling engagement with the outer surface of the filter cloth 56.

The back wash water containing the material dislodged from the filter cloth 56 is captured or collected by a triangularly shaped tray 72 having a discharge end 74 spaced exteriorly of the collecting tank 12 and an inlet end 76 located adjacent the area of contact between the roller 66 and the filter cloth 56. The inlet end 76 of the tray 72 includes an angled or downwardly inclined flange or blade portion 78 which extends substantially along the length of the roller 66 and lightly rides against the outer surface of the filter cloth 56 just ahead of the roller 66.

The tray 72 preferably is arranged so that the blade portion 78 lies on the filter cloth 56 and biased into engagement with the filter cloth solely by the weight of the tray 72. In the specific construction illustrated, the discharge end 74 of the tray 72 rests on the upper edge of the collecting tank rear wall 16 and the inlet end 76 is located above the discharge end 74 to promote gravity drainage of the back wash water from the filter cloth 56. Movement of the tray 72 in a direction away from the drum is restrained by a pair of pins 80 extending upwardly from the collecting tank rear wall 16 and movement of the tray 72 in the direction toward the drum 30 is restrained by a L-shaped bracket 82 which engages the top edge of the rear wall 16. With this arrangement, the blade portion 78 acts much like a doctor blade and, in effect, "scrapes" the back wash water containing the dislodged materials from the filter cloth 66.

In order to promote collection and gravity drainage of the back wash water from the filter cloth 56, the roller 66 preferably is located forwardly, with respect to the direction of drum rotation, of a vertical plane intersecting the rotational axis of the drum (designated by reference numeral 80 in FIG. 2) and the tray 72 is disposed at an incline as best shown in FIG. 2.

The back wash water is discharged from the tray 72 into a settling or sludge tank 84 located adjacent the rear wall 16 of the collecting tank 12. The sludge tank 84 includes one or more baffles 86 which promote settling of the heavier solids from the back wash water, an overflow weir 88 for the clarified water and an outlet 90 through which the excess water is discharged to another location such as back into the sump. In the particular construction illustrated, the sludge tank 84 is separate from the collecting tank 12 and is supported on wheels 91. With this arrangement, the sludge tank 84 is portable and can be conveniently moved to another location for periodical dumping of the settled heavier solids or sludge.

The filtered water 58 is discharged from the open end of the drum shaft 38 into a holding tank or reservoir 92 which preferably is formed integrally with the collecting tank 12 as shown. The filtered water 58 is removed from the reservoir 92 through a hose 93 connected to an outlet 94 and recycled for reuse by a pump 94 (illustrated diagrammatically in FIG. 3) or similar means. For applications where the presence of detergents and other dissolved substance is acceptable, the filtered water can be pumped directly into a supply tank 96 for reuse as illustrated by the solid lines in FIG. 3. When it is desirable to remove detergents and/or other dissolved substances from the filtered water prior to reuse, it is pumped through a suitable separator 98 enroute to the supply tank 96 as illustrated by the dashed lines in FIG. 3.

Lighter solids tending to float on the dirty wash water 11, such as lint, leaves, cigarette butts, etc., can be removed therefrom prior to filtering by overflowing an upper portion of the dirty wash water from the collecting tank 12 through a weired opening 100 provided in the top edge of the front wall 14 of the collecting tank 12. The overflowing wash water is discharged into a sieve or perforated trap 102 which is removably mounted in an overflow tank 104 located adjacent the front wall 14 and preferably formed integrally with the collecting tank 12 as shown. Water is discharged from the overflow tank 104 to another location, such as back into the sump, through a hose 106 connected to an outlet port 108 in the bottom portion of the overflow tank 104. The trap 102 can be removed from the overflow tank 104 for periodic cleaning by lifting on a handle 110 provided on the trap 102.

In the specific construction illustrated, the outlet 90 of the sludge tank 84 is removably connected to the overflow tank 104 by a hose 112.

FIG. 4 illustrates an alternate mounting arrangement for the drum 30. In this arrangement, the shaft 38 of the construction illustrated in FIGS. 1-3 is replaced by a pair of stub shafts 114 (one shown) mounted on the opposite ends of the drum 30. The stub shafts 114 are rotatably mounted in side walls 18 and 20 of the collecting tank 12 in the same manner described above. The stub shaft 114 for the side wall 18 opens into the interior of the drum 30 at one end and at the opposite end opens into the reservoir 92. Thus, the filtered wash water 58 flows directly from the interior of the drum 30 through this stub shaft 114 into the reservoir 92.

I claim:
1. A self-cleaning filter assembly comprising
a collecting tank for receiving a quantity of a liquid containing suspended substances
a hollow drum rotatably mounted in said collecting tank for movement through liquid contained in said collecting tank and including a plurality of perforations in the outer periphery thereof;
a pliable filter material disposed about the outer periphery of said drum for filtering suspended substances from the liquid passing therethrough, the filtered liquid subsequently passing through said drum perforations into the interior of said drum;
a layer of porous, resilient material, capable of absorbing a portion of the filtered liquid passing through said filter material, interposed said filter material and the outer periphery of said drum;
means for rotating said drum;
squeezing means adapted to bear against the outer surface of said filter material and compress said resilient material as said drum is rotated so that a portion of the filtered liquid retained in said resilient material is forced back through said filter material and serves as a back wash for dislodging filtered substances collected on said filter material,
collecting means located adjacent said squeezing means for collecting the back wash liquid containing the dislodged substances; and
means for discharging the filtered liquid from the interior of said drum.

2. A filter assembly according to claim 1 including
a reservoir for receiving the filtered liquid removed from the interior of said drum; and
means for recycling the filtered liquid from said reservoir to a supply tank for reuse.

3. A filter assembly according to claim 1 including
a settling tank for receiving the back wash liquid from said collecting means and separating heavier components therefrom by settling.

4. A filter assembly according to claim 1 wherein
said collecting tank is arranged so that an upper portion of the liquid overflows therefrom; and
said filter assembly further includes means for separating floating substances from the overflowing liquid.

5. A filter assembly according to claim 1 wherein said squeezing means comprises
an elongated roller mounted for rotation about an axis parallel to the rotational axis of said drum; and
means for biasing said roller into rolling engagement with the outer surface of said filter material with sufficient force to effect said squeezing of said resilient material.

6. A filter assembly according to claim 5 wherein said roller biasing means comprises
a support structure rotatably carrying said roller and mounted for pivotal movement relative to said drum such that said roller is biased by gravity into said rolling engagement with said filter material.

7. A filter assembly according to claim 5 wherein said collecting means comprises
a tray having a discharge end spaced exteriorly of said collecting tank and an inlet end located adjacent the area of contact between said roller and said filter material, said inlet end having a blade portion which extends substantially along the length of said roller and rides against the outer surface of said filter material just ahead of said roller with respect to the direction of drum rotation.

8. A filter assembly according to claim 7 wherein
the rotational axis of said roller, with respect to the direction of drum rotation, is located forwardly of a vertical plane intersecting the rotational axis of said drum; and
said tray is inclined so that the collected back wash liquid drains therefrom by gravity.

9. A filter assembly according to claim 1 wherein said means for discharging the filtered liquid from the interior of said drum includes
a hollow shaft member extending through said drum to serve as the axle for said drum and having an internal flow passage, said shaft member having a plurality of ports through which the filtered liquid flows into said flow passage and an open end through which the filtered liquid is discharged from said flow passage exteriorly of said settling tank.

10. A filter assembly according to claim 1 wherein said means for discharging the filtered liquid from the interior of said drum includes
a hollow shaft member mounted on one end of said drum and serving as a part of the axle for said drum, one end of said shaft member opening into the interior of said drum and the opposite end opening exteriorly of said collecting tank.

11. A self-cleaning filter assembly for removing suspended substances from a used wash water or the like comprising a collecting tank for receiving a quantity of the used wash water;

a hollow drum rotatably mounted in said collecting tank for movement through wash water contained in said collecting tank and including a plurality of perforations in the outer periphery thereof;

a hollow shaft member mounted on said drum and serving as at least part of the axle for said drum, said shaft member being open to the interior of said drum and also open exteriorly of said settling tank;

a pliable filter material disposed about the outer periphery of said drum for filtering suspended substances from the wash water passing therethrough, the filtered wash water subsequently passing through said drum perforations into the interior of said drum and exiting from said collecting tank through said shaft member;

a layer of porous, resilient material, capable of absorbing a portion of the filtered wash water passing through said filter material, interposed said filter material and the outer periphery of said drum;

means for rotating said drum;

an elongated roller mounted for rotation about an axis parallel to the rotational axis of said drum and biased into rolling engagement with the outer surface of said filter material with a sufficient force to compress said resilient material as said drum is rotated so that a portion of the filtered wash water retained in said resilient material is forced back through said filter material and serves as a back wash for dislodging filtered substances collected on said filter material; and a tray for collecting the back wash water containing the dislodged substances including a discharge end spaced exteriorly of said collecting tank and an inlet end located adjacent the area of contact between said roller and said filter material, said inlet end having a blade portion which extends substantially along the width of said roller and rides against the outer surface of said filter material just ahead of said roller with respect to the direction of drum rotation.

12. A filter assembly according to claim 11 including a reservoir for receiving the filtered wash water discharged through said shaft member; and means for recycling the filtered wash water to a supply tank for reuse.

13. A filter assembly according to claim 12 including a portable sludge tank for receiving the back wash water from said tray and separating heavier components therefrom by settling.

14. A filter assembly according to claim 13 including a weired opening in the top portion of said collecting tank through which an upper portion of the used wash water containing floating substances overflows;

an overflow tank for receiving the overflowing wash water; and a perforated trap located in said overflow tank for separating floating substances from the overflowing wash water.

15. A filter assembly according to claim 14 wherein said reservoir and said overflow tank are formed integrally with said collecting tank.

* * * * *